United States Patent [19]
Hamilton et al.

[11] Patent Number: 5,362,112
[45] Date of Patent: Nov. 8, 1994

[54] PIPE JOINT CONSTRUCTION AND COUPLING THEREFOR

[75] Inventors: Larry J. Hamilton, McLoud, Okla.; Thomas W. Hawkins, Aurora; Richard P. Shortman, Stow, both of Ohio

[73] Assignee: The Lamson & Sessions Co., Cleveland, Ohio

[21] Appl. No.: 122,773

[22] Filed: Sep. 16, 1993

[51] Int. Cl.5 .............................. F16L 17/06
[52] U.S. Cl. .................... 285/110; 285/331; 285/910
[58] Field of Search ............ 285/331, 336, 423, 910, 285/110

[56] References Cited

U.S. PATENT DOCUMENTS

| | | |
|---|---|---|
| Re. 33,199 | 4/1990 | Karr, Jr. . |
| 52,010 | 1/1866 | Aldrich . |
| 249,594 | 11/1881 | Dietz . |
| 679,399 | 7/1901 | Smith et al. . |
| 795,976 | 8/1905 | Herrick . |
| 1,940,074 | 12/1933 | Burmeister . |
| 2,182,995 | 12/1939 | Pepper et al. ............ 285/331 |
| 2,314,328 | 3/1943 | Enderle . |
| 4,202,568 | 5/1980 | Strom . |
| 4,229,028 | 10/1980 | Gray ....................... 285/423 X |
| 4,326,737 | 4/1982 | Lehmann ................. 285/910 X |
| 4,400,019 | 8/1983 | Fruck . |
| 4,452,462 | 6/1984 | Karr, Jr. . |
| 4,614,371 | 9/1986 | Bauder ................... 285/910 X |
| 4,796,669 | 1/1989 | St. Onge . |
| 4,819,972 | 4/1989 | Champa et al. . |

FOREIGN PATENT DOCUMENTS

| | | |
|---|---|---|
| 91447 | 2/1959 | Denmark . |
| 366637 | 5/1990 | European Pat. Off. ............ 285/331 |
| 619385 | 9/1935 | Germany . |
| 260610 | 10/1928 | Italy ................................. 285/336 |
| 91304 | 1/1959 | Netherlands . |
| 6405294 | 11/1964 | Netherlands . |
| 392170 | 9/1965 | Switzerland . |

*Primary Examiner*—Dave W. Arola
*Attorney, Agent, or Firm*—Fay, Sharpe, Beall, Fagan, Minnich & McKee

[57] ABSTRACT

A pipe joint and coupling construction particularly suited for joining large diameter plastic pipe as used in sewer relining. The construction comprises first and second sections of cylindrical pipe having axially aligned opposed end walls with a continuous groove formed in each end wall. The groove in each end wall is axially aligned with the groove in the opposed end wall and cooperates therewith to form a gasket receiving chamber. The coupling member is adapted to be mounted in the gasket receiving chamber for sealingly joining the pipe sections. It comprises a rigid annular core ring for mounting in the chamber to extend axially into each of the axially aligned grooves. A resilient compressible elastomeric covering is positioned over the core ring and carried circumferentially continuous radially extending protrusions which are sized to be sealingly compressed between the core ring and the side walls of the grooves.

6 Claims, 2 Drawing Sheets

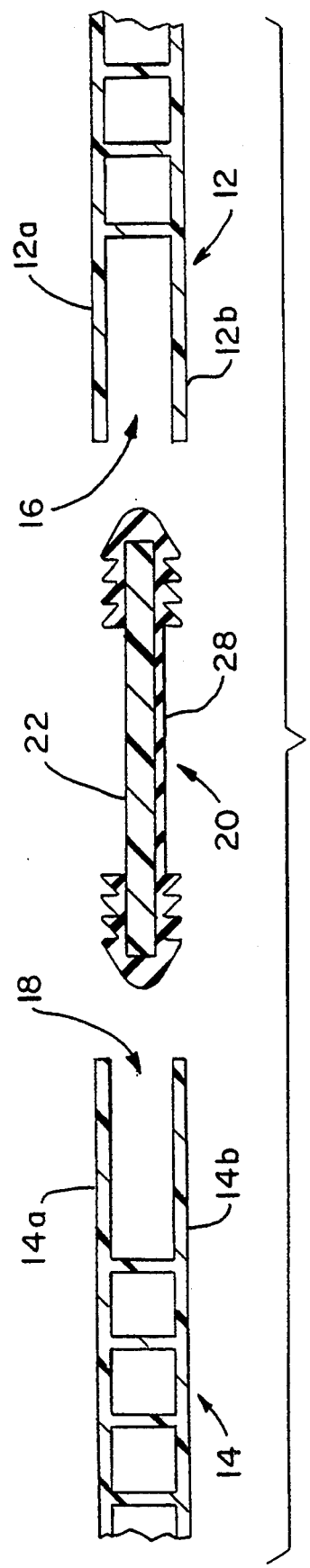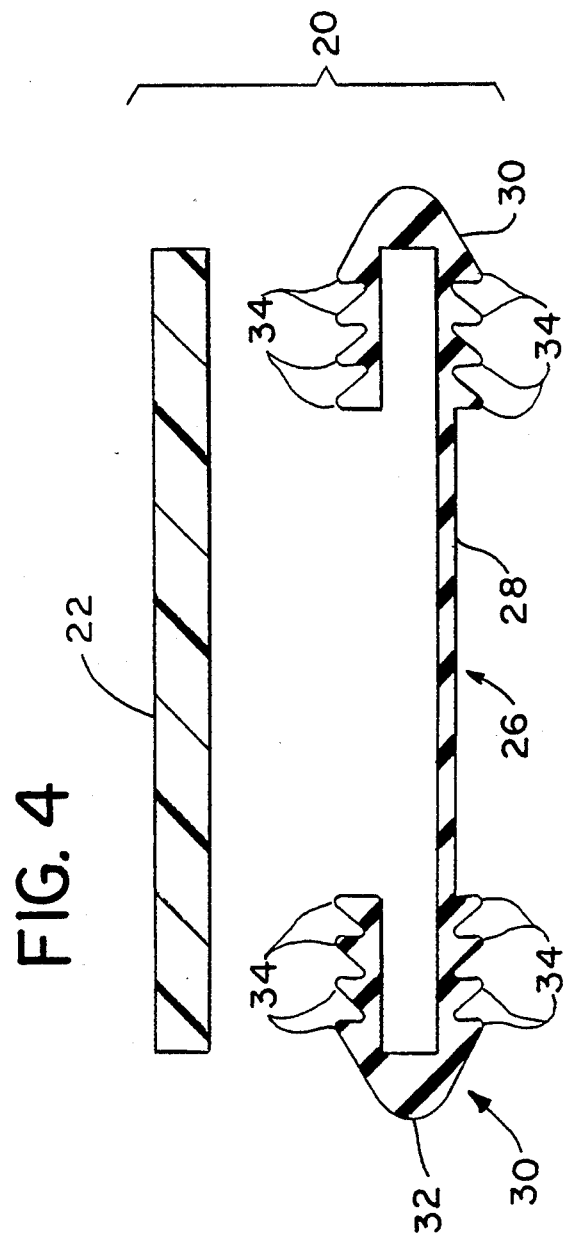

PIPE JOINT CONSTRUCTION AND COUPLING THEREFOR

BACKGROUND OF THE INVENTION

The subject invention is directed toward the art of pipe joints and, more particularly, to a pipe joint construction which can provide a smooth transition on both the interior and exterior at the junction between the joined pipe sections.

The invention is especially suited for joining large diameter plastic pipe used in relining sewer lines and will be described with reference thereto; however, the invention is capable of broader application and could be used for joining pipes of a variety of sizes used in many environments.

In recent years, techniques have been developed for relining degraded sewer lines by driving sections of plastic pipe axially into the sewer line from a spaced series of access openings.

It is highly desirable that the inserted pipe have a smooth outer diameter sized to closely but freely fit within the existing line. Also, the interior of the pipe must be smooth to offer little resistance to flow.

The above requirements present severe limitations on the design of the couplings or joints used to connect the inserted pipe sections. Specifically, the need for smooth interior and exterior surfaces, the high axial loads applied during pipe insertion, and the necessity of being able to provide a fluid-tight seal and withstand lateral loads place special demands on the joint construction.

SUMMARY OF THE INVENTION

The subject invention provides a joint construction which satisfies the noted requirements in a highly effective and economical manner. In accordance with the subject invention, there is provided a pipe joint construction which is particularly suited for joining large diameter pipe. The construction comprises first and second sections of the large diameter cylindrical pipe having opposed aligned end walls each provided with axially aligned annular grooves formed inwardly of each end wall circumferentially of the pipe. A coupling member joins the pipe sections and includes an annular ring member sized to be received in the aligned annular grooves and to extend between the first and second sections. The annular ring member includes a rigid annular core with a resilient elastomeric exterior covering that includes a plurality of radially extending, axially flexible protrusions located on both the radial interior and radial exterior of the rigid annular core. The protrusions are compressed between the rigid annular core and the walls of the annular grooves.

The arrangement is such that the rigid annular core provides strength and rigidity to the joint and allows transmission of axial forces necessary for inserting the sections into a degraded sewer during relining operations. The resilient and compressed protrusion portions of the resilient elastomeric exterior of the coupling serve to seal the joint structure and provide a relatively significant holding force to maintain the sections joined.

In accordance with a more limited aspect of the invention, the rigid annular core of the coupling member is preferably formed from a rigid plastics material, and the protrusions on the flexible covering extend circumferentially of the core and are preferably circumferentially continuous at least adjacent the axial ends of the core.

In accordance with a still further aspect of the invention, the rigid annular core is preferably circumferentially continuous and has an axial length so as to extend a substantial distance into each of the aligned annular grooves. Preferably, the total axial length of the coupling member, including the core and the resilient exterior covering, is at least slightly greater than the total combined axial length of the aligned annular grooves.

The construction is such that the coupling member can be driven into position by aligning it with the pipes and moving them axially toward one another. The coupling, when used in relining degraded sewers and the like, can be used to sequentially join individual pipe sections with the preceding pipe section and then drive the joined sections together and into the degraded sewer line.

As can be seen from the foregoing, the resulting joint structure has no protrusions extending away from the interior or the exterior surfaces of the pipe. That is, the entire assembly is received within the two aligned annular end grooves to allow the exterior and interior of the pipe to remain smooth and continuous. This is particularly desirable when the assembly is used in a relining operation wherein the pipe sections are inserted into an existing line. Additionally, the absence of any structure extending into the interior flow area of the pipe assures that the resistance to fluid flow is not adversely affected by the joint structure.

As can be seen from the above discussion, the subject invention has for its primary object the provision of an improved joint structure which is particularly suited for joining large diameter pipes as used in sewer relining operations.

Yet another object of the invention is the provision of a joint structure of the general type described which can be assembled merely by applying axial load forces to the pipe sections.

A further object of the invention is to provide a joint structure of the type under consideration wherein the joint seals the pipes against fluid leakage and also is capable of resisting axial force loadings of the type necessary for sewer relining operations.

A still further object is the provision of a coupling of the type described which is economical and comparatively easy to install.

BRIEF DESCRIPTION OF THE DRAWINGS

The above and other objects and advantages will become apparent from the following description when read in conjunction with the accompanying drawings wherein:

FIG. 3 is an enlarged view showing the joint structure in an aligned but disassembled position; and, FIG. 4 is a cross-sectional view showing the individual components of the coupling member used in the joint construction of FIG. 1 (the components are shown in a disassembled position).

DETAILED DESCRIPTION OF THE PREFERRED EMBODIMENT

Figure 1:
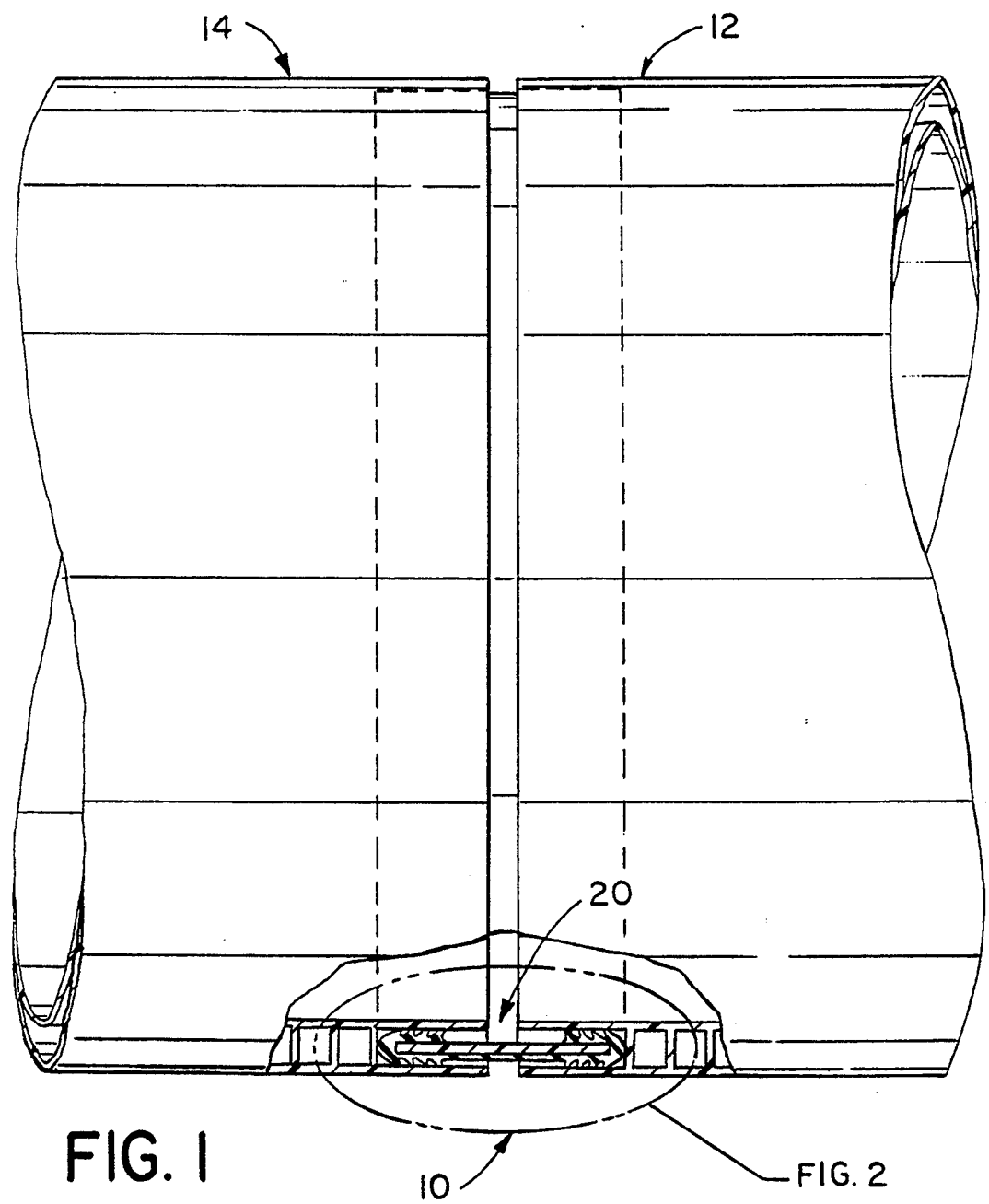
FIG. 1 is a side elevational view of pipe sections joined using a joint structure formed in accordance with the subject invention (a portion of the pipe ends have been broken away to show the interior details more clearly)

Referring more particularly to the drawings wherein the showings are for the purpose of illustrating a preferred embodiment of the invention only and not for the purpose of limiting same, FIG. 1 shows the overall arrangement of a joint structure 10 used to join aligned sections 12 and 14 of large diameter plastic pipe of the type used in sewer relining operations. The pipe sections 12 and 14 could be of many types but, in the subject embodiment, comprise a spiral wound, extruded pipe form of the type shown and described in U.S. Pat. No. 3,926,223, issued Dec. 16, 1975 and entitled "Large Diameter Hollow Bodies of Helical Thermoplastic Strip." Broadly, the pipe is formed by spirally extruding a rectangular cross section plastic tube or tubes onto a mandrel such that the resulting cylindrical pipe sections 12 and 14 comprise inner and outer side walls (12a, 12b, 14a, 14b) connected by a transverse spiral walls (12c, 14c). In the subject embodiment, the ends of sections 12 and 14 are joined by the joint assembly 10 in aligned and fluid sealed relationship.

Figure 2:
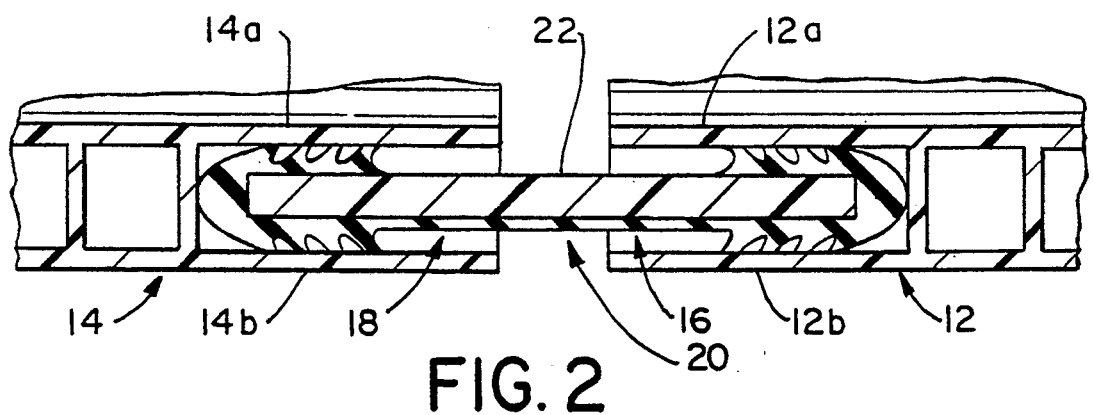
FIG. 2 is a greatly enlarged view of the circled area of FIG. 1.

The joint structure 10 is arranged and designed so as to hold the pipe sections 12 and 14 in aligned relationship against axial separation and to allow substantial axial compressive forces generated during relining operations to be transmitted between the sections. In general, the construction under consideration comprises aligned circumferentially continuous end grooves 16 and 18 formed respectively in the ends of sections 12 and 14. As best seen in FIGS. 2 and 3 which show the joint assembly in its assembled and disassembled conditions respectively. The grooves 16 and 18 could be formed in a variety of different manners but are preferably formed in the subject embodiment by removing interconnecting transverse walls in the pipe sections through a routing operation. The resulting axially inward extending grooves 16, 18 thus have relatively smooth walls and the inner and outer exterior walls of the pipe sections, for example, 12a and 12b are not damaged by the formation of the groove and the integrity of the pipe section is maintained.

The grooves 16 and 18 receive and engage with the coupling member 20 which acts to both seal and join the abutting mating ends of the sections 12 and 14. The construction of the coupling member 20 can best be understood by reference to FIGS. 3 and 4. As illustrated therein, the coupling member 20 generally includes a rigid core 22 which has the shape of an annular ring or tube section and is preferably formed from a relatively rigid plastic such as a rigid propylene polyester or the like which can be filled with suitable strengthening fibers if desired. Preferably, the core is circumferentially continuous and has an axial length substantially as great as the total axial length of the opposed grooves 16 and 18. The core 22 could, of course, be formed from other materials and could under certain circumstances be circumferentially discontinuous so that it could be radially expanded or contracted to better align with the grooves if desired. The total radial thickness of the ring is, as shown, substantially less than the radial width of the groves 16 and 18.

Positioned about the exterior of the rigid core 22 is a resilient elastomeric exterior covering formed from a suitable plastic or rubber such as a neoprene or SBR to provide the gasketing and axial holding for the coupling member 20. In the subject embodiment, the exterior covering is formed as a separate molded element 26 which resiliently receives and engages about the exterior of the center ring or core 22.

FIG. 4 best illustrates element 26 in cross-sectional view, and as seen therein, it comprises a central connecting web member 28 which joins the end portions 30. The end portions 30 are shown as being of identical construction and include a tapered and rounded end nose 32 and opposed radially directed protrusions shown in the form of teeth or tab elements 34 which are preferably circumferentially continuous about both the radial interior and exterior of member 26. The teeth are tapered and inclined as shown so that they radially deflect when the coupling member 20 is inserted in the grooves 16, 18.

The design of member 26 is such that it can be resiliently distended to engage about the exterior of the core 22 to the assembled position shown in FIG. 2. The combined or total radial thickness of member 20 is such that when it is driven into position in the aligned grooves 16 and 18, the protrusions must be radially compressed as shown in FIG. 3. This radial compression causes the protrusions and, in turn, members 26 and 22 to be firmly locked into position and tightly engaged in the grooves 16 and 18. As a result, a fluid seal is achieved and the joint is capable of withstanding substantial axial loads tending to disassembly the joint.

The rigid core 22 serves to allow substantial axial compressive forces to be conducted between the aligned sections as required during sewer relining operations. To assure that the insertion forces applied are transmitted through the coupling 26 and not by engagement of the ends of walls 12a, 12b with 14a and 14b, the total axial length of coupling 26 is at least slightly greater than the combined axial depth of grooves 16, 18.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A pipe joint construction particularly suited for joining large diameter plastic pipe as used in sewer relining, said joint comprising:

first and second sections of cylindrical pipe having axially aligned opposed end walls with an axially inward circumferentially continuous groove formed in each end wall and defined by radially spaced side walls and a bottom wall, the groove in each end wall being axially aligned with the groove in the opposed end wall and cooperating therewith to form a gasket receiving chamber; and a coupling member mounted in the gasket receiving chamber for sealingly joining the pipe sections, the coupling member comprising a rigid annular core ring mounted in the chamber and extending axially into each of the axially aligned grooves, a resilient compressible elastomeric covering over the core ring and having axially spaced end portions carrying circumferentially continuous radially extending protrusions which are compressed between the core ring and the side walls of the grooves into sealing engagement with the side walls of the grooves on both the radial inner and radial outer sides of the core ring, said covering end portions joined by an intermediate portion and the core ring having a length substantially as great as the combined axial length of the grooves in the opposed end walls and the coupling member has a length at least slightly greater than the combined axial length of the grooves in the opposed ends walls to assure that axial insertion forces applied to the pipe sections during a sewer relining operation are transmitted through the coupling member without direct engagement of the opposed end walls of the pipe sections.

2. A pipe joint construction as defined in claim 1 wherein the core ring is of generally rectangular cross section.

3. A pipe joint construction as defined in claim 1 wherein the core ring is formed from a fiber reinforced plastics material.

4. A pipe joint construction as defined in claim 1 wherein the elastomeric covering is resiliently engaged and retained over the core ring.

5. A pipe joint construction as defined in claim 1 wherein the end portions of the elastomeric covering terminate in tapered nose portions.

6. A pipe joint construction as defined in claim 1 wherein the intermediate portion of the elastomeric covering is an elastic web which retains the end portions on the core ring.

* * * * *